US012615253B2

(12) United States Patent
Dhumpeti et al.

(10) Patent No.: US 12,615,253 B2
(45) Date of Patent: Apr. 28, 2026

(54) SYSTEM AND METHOD OF SHARING USER CREDENTIALS

(71) Applicant: HONEYWELL INTERNATIONAL INC., Charlotte, NC (US)

(72) Inventors: Mahesh Dhumpeti, Hyderabad (IN); Laxmi Krishna Kanth Jarugumilli, Hyderabad (IN); Yuri Novozhenets, Pittsford, NY (US); Kishore Maroju, Hyderabad (IN); Rajesh Krishna Etikela, Hyderabad (IN); Gokul Ellanki, Hyderabad (IN); Ramesh Lingala, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 307 days.

(21) Appl. No.: 18/181,843

(22) Filed: Mar. 10, 2023

(65) Prior Publication Data

US 2023/0291733 A1 Sep. 14, 2023

(30) Foreign Application Priority Data

Mar. 10, 2022 (IN) ............................ 202211013072

(51) Int. Cl.
*H04L 9/40* (2022.01)

(52) U.S. Cl.
CPC ...... *H04L 63/0853* (2013.01); *H04L 63/0876* (2013.01)

(58) Field of Classification Search
CPC ............ H04L 63/0853; H04L 63/0876; H04L 63/102; G07C 9/25; G07C 2009/00976
See application file for complete search history.

(56) References Cited

U.S. PATENT DOCUMENTS

| | | | |
|---|---|---|---|
| 7,069,444 B2 | 6/2006 | Lowensohn et al. | |
| 7,322,043 B2 | 1/2008 | Letsinger | |
| 8,028,905 B2 | 10/2011 | Holberg | |
| 8,478,195 B1 | 7/2013 | Hewinson | |

(Continued)

FOREIGN PATENT DOCUMENTS

| | | | |
|---|---|---|---|
| AU | 2010315111 A1 | 6/2012 | |
| AU | 2013274781 A1 | 12/2014 | |

(Continued)

*Primary Examiner* — Khoi V Le

(74) *Attorney, Agent, or Firm* — Seager, Tufte & Wickhem, LLP

(57) ABSTRACT

A system and method of sharing user credentials by use of a virtual electronic badge to validate an entry of a user within an authorized building/premises. The system includes a first device associated with a user configured to store a unique identifier that represents a user credential issued to the user. The second device is configured to communicate with the first device and obtain the unique identifier associated with the user. The system includes a server which is communicably coupled with the first device and the second device and configured to store therein a profile information of users related to the first device and the second device. The system further includes that the second device communicates the unique identifier with the server and receives the profile information related to the user of the first device which is reproduced in the form of electronic badge on the second electronic device.

16 Claims, 3 Drawing Sheets

(56) References Cited

U.S. PATENT DOCUMENTS

| | | | |
|---|---|---|---|
| 8,700,000 | B2 | 4/2014 | Pauliac |
| 9,009,817 | B1 | 4/2015 | Wieland |
| 9,064,128 | B1 | 6/2015 | Pelenur et al. |
| 9,256,869 | B2 | 2/2016 | Nandagopal |
| 9,397,838 | B1 | 7/2016 | Chen |
| 9,436,165 | B2 | 9/2016 | Narendra et al. |
| 9,510,193 | B2 | 11/2016 | Su et al. |
| 9,894,058 | B2 | 2/2018 | Leow |
| 9,953,151 | B2 | 4/2018 | Leow |
| 10,074,075 | B2 | 9/2018 | Nazzari et al. |
| 10,075,843 | B1 | 9/2018 | Schuler et al. |
| 10,270,767 | B2 | 4/2019 | Terasaki |
| 10,477,345 | B2 | 11/2019 | Brown et al. |
| 10,628,573 | B2 | 4/2020 | Gibbs et al. |
| 10,880,311 | B1 | 12/2020 | Borunda et al. |
| 10,929,738 | B1 | 2/2021 | Balgaon et al. |
| 10,951,698 | B2 | 3/2021 | Jhanji et al. |
| 11,048,781 | B1 | 6/2021 | Gayles et al. |
| 11,206,259 | B2 | 12/2021 | Storm et al. |
| 11,210,381 | B2 | 12/2021 | Chang |
| 11,374,937 | B2 | 6/2022 | Shultz et al. |
| 11,451,538 | B2 | 9/2022 | Chellappan et al. |
| 11,611,682 | B2 | 3/2023 | Kitahashi et al. |
| 11,616,784 | B2 | 3/2023 | Kwatra et al. |
| 11,621,942 | B2 | 4/2023 | Shaikh et al. |
| 11,627,000 | B2 | 4/2023 | Hamel et al. |
| 11,971,974 | B2 | 4/2024 | Suraparaju |
| 12,028,717 | B2 | 7/2024 | Park et al. |
| 2002/0115449 | A1 | 8/2002 | Allen |
| 2005/0225430 | A1 | 10/2005 | Seifert |
| 2009/0077654 | A1 | 3/2009 | Hong |
| 2009/0197571 | A1 | 8/2009 | Kitajima et al. |
| 2011/0119155 | A1 | 5/2011 | Hammad et al. |
| 2012/0154117 | A1 | 6/2012 | Nice et al. |
| 2013/0152183 | A1* | 6/2013 | Plewnia ................. H04L 63/08 726/7 |
| 2014/0245408 | A1 | 8/2014 | Ballapalle et al. |
| 2014/0282937 | A1 | 9/2014 | Farber |
| 2015/0106270 | A1 | 4/2015 | Burrell et al. |
| 2015/0201328 | A1 | 7/2015 | Klein et al. |
| 2015/0371026 | A1 | 12/2015 | Gnanasekaran |
| 2016/0026937 | A1 | 1/2016 | Gormley |
| 2016/0149897 | A1 | 5/2016 | Adelman et al. |
| 2016/0301689 | A1 | 10/2016 | Roy et al. |
| 2016/0373930 | A1 | 12/2016 | Dennis et al. |
| 2017/0026385 | A1 | 1/2017 | Zarkesh et al. |
| 2017/0034218 | A1* | 2/2017 | Rasband ................. H04W 4/80 |
| 2017/0076082 | A1 | 3/2017 | Arber |
| 2017/0353451 | A1 | 12/2017 | Metke et al. |
| 2018/0332033 | A1* | 11/2018 | Lakhani ................. G06F 21/35 |
| 2018/0332048 | A1 | 11/2018 | Childress et al. |
| 2019/0087836 | A1 | 3/2019 | Anbarasan et al. |
| 2019/0156005 | A1 | 5/2019 | Cornick et al. |
| 2019/0191298 | A1 | 6/2019 | Kim et al. |
| 2019/0197815 | A1 | 6/2019 | Kamal et al. |
| 2019/0279061 | A1 | 9/2019 | Kuan |
| 2019/0318122 | A1* | 10/2019 | Hockey ............... G06F 21/6245 |
| 2020/0099683 | A1 | 3/2020 | Alexander et al. |
| 2020/0186523 | A1 | 6/2020 | Kursun et al. |
| 2021/0019756 | A1 | 1/2021 | Rule et al. |
| 2021/0111885 | A1 | 4/2021 | Kubovcik et al. |
| 2021/0200853 | A1 | 7/2021 | Lagnado et al. |
| 2021/0258796 | A1 | 8/2021 | Zhuofei |
| 2021/0281573 | A1 | 9/2021 | Mars et al. |
| 2021/0287202 | A1 | 9/2021 | Fowler et al. |
| 2021/0314309 | A1 | 10/2021 | Lee et al. |
| 2022/0129585 | A1 | 4/2022 | Narayanswamy et al. |
| 2022/0237573 | A1 | 7/2022 | Jessamine |
| 2023/0028611 | A1 | 1/2023 | Houser et al. |
| 2023/0131095 | A1 | 4/2023 | Korten et al. |
| 2023/0133210 | A1 | 5/2023 | Hammad et al. |
| 2023/0214852 | A1 | 7/2023 | Andreas et al. |
| 2024/0112203 | A1 | 4/2024 | Hartsell et al. |
| 2024/0129124 | A1 | 4/2024 | Apsingekar et al. |
| 2024/0330925 | A1 | 10/2024 | Soundararajan |

FOREIGN PATENT DOCUMENTS

| | | | |
|---|---|---|---|
| AU | 2015230668 | A1 | 9/2016 |
| AU | 2020202925 | A1 | 5/2020 |
| AU | 2018390325 | A1 | 6/2020 |
| CA | 2430826 | A1 | 6/2002 |
| CA | 2859045 | A1 | 7/2013 |
| CA | 2836172 | A1 | 9/2014 |
| CA | 2904438 | A1 | 9/2014 |
| CA | 2986003 | A1 | 11/2016 |
| CA | 3024158 | A1 | 12/2017 |
| CA | 3073197 | A1 | 2/2019 |
| CA | 3144492 | A1 | 1/2021 |
| CA | 3170270 | A1 | 9/2021 |
| EP | 1859382 | A2 | 11/2007 |
| EP | 2787709 | A1 | 10/2014 |
| EP | 2881879 | A1 | 6/2015 |
| EP | 3677059 | A1 | 7/2020 |
| EP | 3803648 | A1 | 4/2021 |
| EP | 3822832 | A1 | 5/2021 |
| EP | 4226338 | A2 | 8/2023 |
| GB | 2412211 | A | 9/2005 |
| WO | 00/74002 | A1 | 12/2000 |
| WO | 02/93961 | A1 | 11/2002 |
| WO | 2006/101698 | A2 | 9/2006 |
| WO | 2014/042687 | A1 | 3/2014 |
| WO | 2014/055279 | A1 | 4/2014 |
| WO | 2014/151507 | A1 | 9/2014 |
| WO | 2015/160775 | A1 | 10/2015 |
| WO | 2016/044543 | A1 | 3/2016 |
| WO | 2017/136940 | A1 | 8/2017 |
| WO | 2019/006212 | A1 | 1/2019 |
| WO | 2019/164851 | A1 | 8/2019 |
| WO | 2022/260851 | A2 | 12/2022 |

* cited by examiner

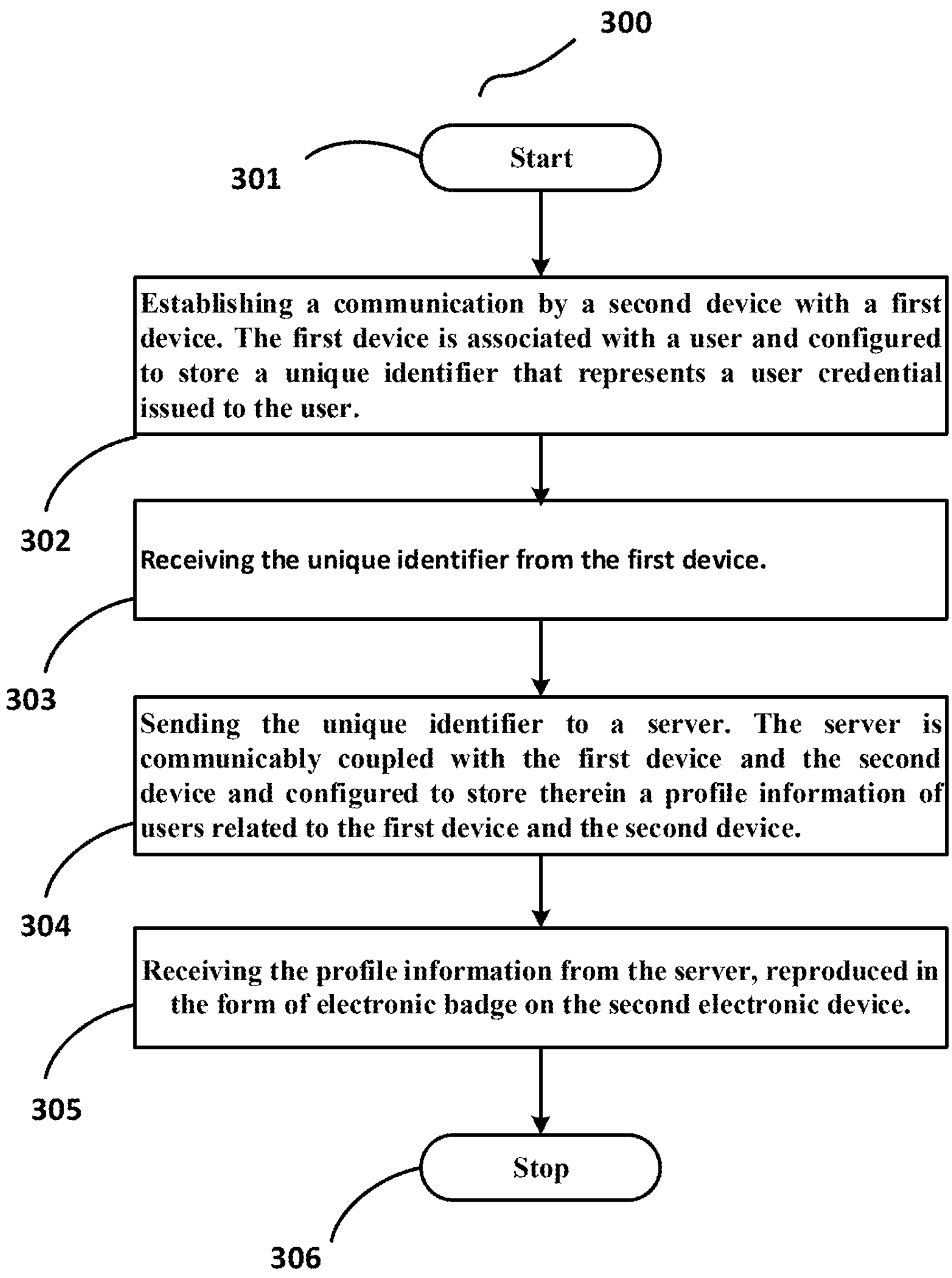

301    Start

Establishing a communication by a second device with a first device. The first device is associated with a user and configured to store a unique identifier that represents a user credential issued to the user.

302

Receiving the unique identifier from the first device.

303

Sending the unique identifier to a server. The server is communicably coupled with the first device and the second device and configured to store therein a profile information of users related to the first device and the second device.

304

Receiving the profile information from the server, reproduced in the form of electronic badge on the second electronic device.

305

Stop

306

SYSTEM AND METHOD OF SHARING USER CREDENTIALS

FOREIGN PRIORITY

This application claims priority to Indian Patent Application number 202211013072, filed Mar. 10, 2022, and all the benefits accruing therefrom under 35 U.S.C. § 119, the contents of which in its entirety are herein incorporated by reference.

TECHNICAL FIELD OF INVENTION

The present disclosure relates to a system and a method of validating an individual. More particularly, the present disclosure relates to a system and a method of sharing user credentials by using an electronic badge.

BACKGROUND OF THE INVENTION

In an office establishment or a building, generally a guard sits at a front desk monitoring entry and exit of people. An employee or a guest, while entering the building, presents a badge to access reader installed at a door to gain entry into the premises. The reader authenticates the data and allows entry. However, the identity of a person carrying the badge cannot be verified with the badge data. An unauthorized person may use the badge of an authorized person and can misuse the badges and it may become a security concern.

Further, when a new user arriving at the building always requests the security team or admin to provide access to the building to do his/her job. On an average, it takes a few minutes for new user registration and to provide him/her an access card or a badge. If more users are waiting for access, then it takes a longer time and waiting at entrance creates an awkward situation for building occupants.

The badges need to be worn and may get damaged in due course and then need to be replaced. The replacement of badges takes time and therefore valuable time is spent in providing the replacement card.

In view of the aforementioned problems in the existing art, there is a need of a robust system and a method for providing an automatic authentication and enhancing the security. Also, there is requirement of a system and a method that can efficiently work towards sharing of publicly available user information. There is also a need of a system and a method for avoiding waiting time for new entrants in the building and avoiding inconvenience to the occupants of the building. In order to solve the problems in the existing solutions, a system and a method are disclosed.

SUMMARY OF THE INVENTION

Various embodiments of the invention describe system and method of sharing user credentials by use of a virtual electronic badge to validate an entry of a user within an authorized building/premises. The system comprises a first device associated with a user configured to store a unique identifier that represents a user credential issued to the user. The second device is configured to communicate with the first device and obtain the unique identifier associated with the user. The system comprises a server which is communicably coupled with the first device and the second device and configured to store therein a profile information of users related to the first device and the second device. The system further comprises that the second device communicates the unique identifier with the server and receives the profile information related to the user of the first device which is reproduced in the form of electronic badge on the second electronic device.

In an embodiment of the invention, the second device communicates with the first device via a client application.

In a yet another embodiment of the invention, the first device and the second device are pre-registered with the server.

In still another embodiment of the invention, the second device communicates with the first device and receives consent from the user of the first device to access unique identifier related to the first device.

In a different embodiment of the invention, the server validates the user of the first electronic device by matching the unique identifier with information present in a database associated with the server.

In another embodiment of the invention, the client application associated with the second device communicates with a corresponding server application coupled to the database of the server.

In another embodiment of the invention, the profile information comprises a personal information such as name, address, User ID, images, encrypted QR code, employer and combination thereof which identify the user.

In yet another embodiment of the invention, the second device communicates with the first device via a Bluetooth, Wi-Fi, ultrawideband (UWB), or Internet of Things (IoT).

In still another embodiment of the invention, the information on the electronic badge comprises user profile data and accessibility of the user at a designated location.

In another embodiment of the invention, wherein the accessibility comprises whether the user is “allowed” or “denied access” at the designated location.

Various embodiments of the invention also disclose a method comprising establishing a communication by a second device with a first device. The first device is associated with a user and is configured to store a unique identifier that represents a user credential issued to the user. The method further receives, the unique identifier from the first device. Further, the method describes sending the unique identifier to a server where the server is communicably coupled with the first device and the second device and configured to store therein a profile information of users related to the first device and the second device. The method is further configured to receive the profile information from the server, reproduced in the form of an electronic badge on the second electronic device.

In an embodiment of the invention, the second device communicates with the first device via a client application.

In another embodiment of the invention, the first device and the second device are pre-registered with the server.

In still another embodiment of the invention, the second device communicates with the first device and receives consent from the user of the first device to access unique identifier related to the first device.

In an embodiment of the invention, the server validates the user of the first electronic device by matching the unique identifier with information present in a database associated with the server.

In another embodiment of the invention, the client application associated with the second device communicates with a corresponding server application coupled to the database of the server.

In an embodiment of the invention, the user profile data comprises a personal information such as name, address, User ID, images, encrypted QR code, employer and combination thereof which identify a particular individual or user.

In an embodiment of the invention, the second device communicates with the first device via a Bluetooth, Wi-Fi or Internet of Things (IoT).

In yet another embodiment of the invention, the information on the electronic badge comprises user profile data and accessibility of the user in a designated location.

Various embodiments of the invention disclose a computer readable medium comprising one or more processors and a memory coupled to the one or more processors, the memory storing instructions executed by the one or more processors. The one or more processors configured to establish a communication with a first device where the first device is associated with a user and configured to store a unique identifier that represents a user credential issued to the user. The one or more processors is configured to receive the unique identifier from the first device. The one or more processors is further configured to send the unique identifier to a server, in response to receiving of the unique identifier wherein the server is communicably coupled with the first device and the second device and configured to store therein a profile information of users related to the first device and the second device. The one or more processors is also configured to receive the profile information from the server reproduced in the form of electronic badge.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Exemplary embodiments according to the invention and including further advantageous features of the invention are explained below, referring to the attached drawings, in which:-

FIG. 3 depicts an exemplary flowchart illustrating a method to perform the invention according to an exemplary embodiment of the invention.

Corresponding reference numerals indicate corresponding parts throughout the drawings.

DETAILED DESCRIPTION OF THE INVENTION

Embodiments of the invention are directed to system and method of sharing user credentials by use of virtual electronic badge to validate an entry of a user within an authorized building/premises. A server/cloud may be installed within the building which stores a plurality of profile information data or particulars such as name, address, User ID, images, encrypted QR code, employer, work area/location associated with different users and combination thereof in its database. Each profile information corresponds to a particular identification electronic badge which is reproduced on a user device. In particular, the present disclosure describes a first device associated with a user and configured to store a unique identifier that represents a user credential issued to the user. A second device is configured to communicate with the first device and obtain the unique identifier associated with the user. The second device transmits the unique identifier to a server which is communicably coupled with the first device and the second device and configured to store therein a profile information of users related to the first device and the second device. The server transmits the profile information to the second device which receives the profile information related to the user of the first device. The profile information is reproduced in the form of an electronic badge on the second electronic device. In this way using the second device, the user of the first device can be authenticated.

As used herein, the server may be comprised of a server computer, cloud-based computer, virtual computer, or a computer system capable of receiving and transmitting data via IP networks and the telecommunication networks that is well known to a person skilled in the art.

As used herein, a first device or second device or mobile device may include iPad, smartphone, mobile phones, tablets, wearable devices such as electronic watches and the like those are well known to a person skilled in the art. The first and second devices may communicate using short-range communication such as Bluetooth, Wi-Fi, ultrawide band (UWB) and the like.

As used herein, electronic badge may be identity of a user or a person which is rendered on the first device and the second device such as mobile phone, tablet, or any access credentialing device.

As used herein, the network or network connections may be any wireless network (such as Global System for Mobile communication (GSM) network, Code-Division Multiple Access (CDMA) network, Long-Term Evolution (LTE) network), a Wi-Fi network, a Bluetooth network, a ZigBee network, a near-field communication network, or any such network that is well known to a person skilled in the art.

Figure 1:
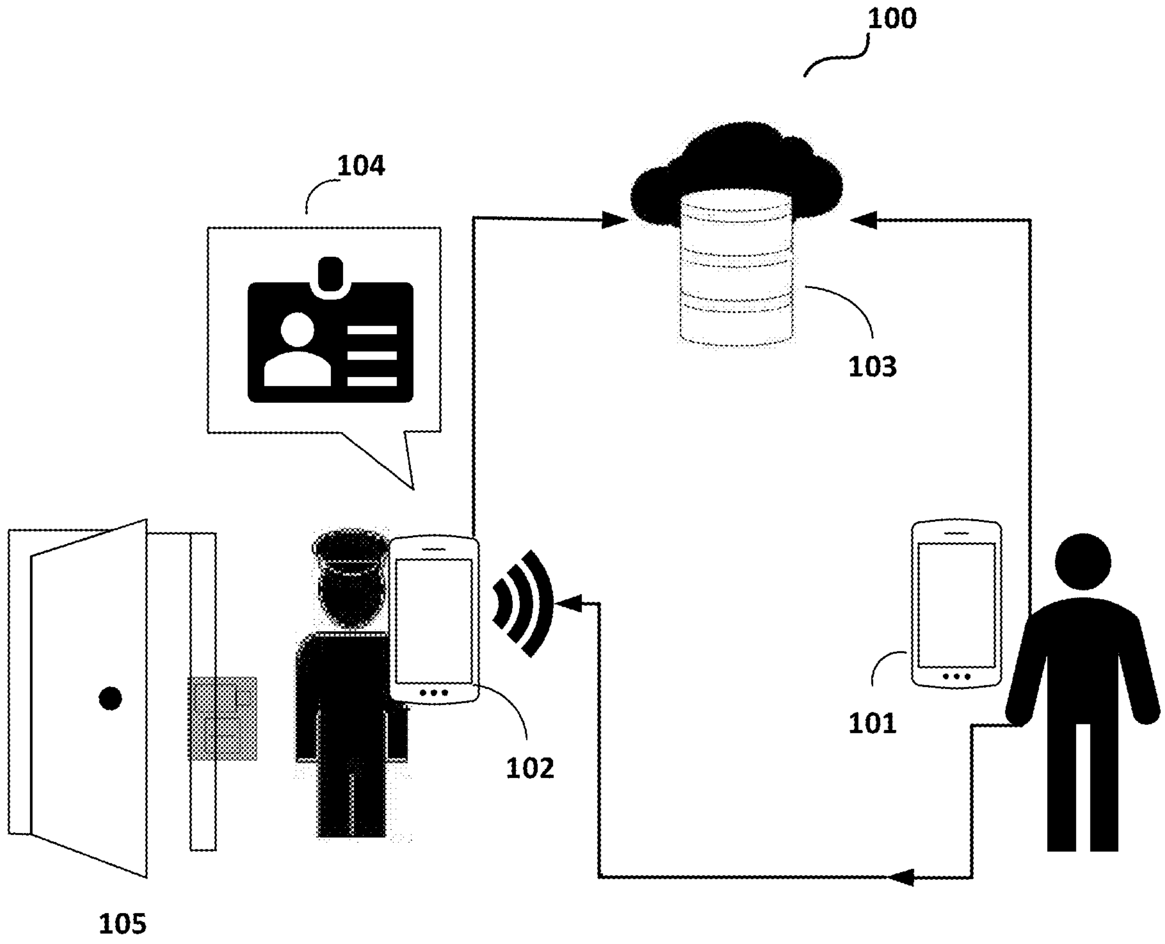
FIG. 1 illustrates an exemplary system according to an exemplary embodiment of the invention.

FIG. 1 illustrates an exemplary system (100) according to an exemplary embodiment of the invention. FIG. 1 illustrates a first device (101) also referred as a first electronic device which is associated with a unique identifier. The unique identifier enables the first device (101) to be identified. In other words, the unique identifier may be in the form of user credentials which are used to uniquely identify a given device such as the first device (101). It is to be noted that the first device (101) and the second device (102) may communicate using communication pathway, for instance, a short-range communication pathway such as Bluetooth or radio-frequency identification (RFID), active NFC communication, Wi-Fi, a mobile service provider network (e.g., a 3G, 4G or 5G) and the like.

FIG. 1 further illustrates a second device (102) which may initiate a communication with the first device (101). A communication may be established between the first device and the second device. The second device (102) may be pointed towards the first device to initiate the communication. As a result of establishing the communication between the first device (101) and the second device (102), the unique identifier may be received from the first device (102). The first device and the second device may be already registered over a network or on the server/cloud 103. It may be noted that communication between the first device (101) and the second device (102) may be established automatically. As an example, the first device (101) and the second device (102) may be present on a same secure network through a server (103) and accordingly, the first device (101) and the second device (102) may connect automatically.

Alternatively, the second device (102) may seek consent from the first device (101) when initiating communication with the first device (101). The first device (101) may be configured to provide the consent request to exchange an information to the second device (102). In response to receiving the consent request, the user of the second device (102) is provided with an option to accept or deny the request for establishing a communication with the first device (101). The consent request also provides a secure communication between the first device (101) and the second device (102). Once the communication is established, the first device (101) may transmit the unique identifier and the second device (102) may receive the unique identifier. The second device (102) may provide the unique identifier to a server application of the server (103). The second device may be associated with a client application which is configured to communicate with the server (103)

The server (103) may be adapted to transmit and receive data with the second device (102). The server (103) is configured with the server application which facilitates the receiving and transmit of information from the second device (102). The server (103) further comprises a database which stores the profile information data. The profile information data comprises name, address, User ID, images, encrypted QR code, employer, work area/location associated with different users and combination thereof. Each profile information corresponds to a particular identification electronic badge corresponding to a user of the devices on network.

On receiving the unique identifier from the second device (102), the server application processes and compares the unique identifier with the stored unique identifiers. On comparison, the server may determine the unique identity of the user of the first device (101). The server (103) may identify the profile information of the user associated with the unique identifier and send the profile information of the user associated with the unique identifier on the second device (102). The profile information may be reproduced in the form of an electronic badge on the second device (102). By using the electronic badge (104) of the user on the second device (102) the user may be successfully authenticated as being at least an eligible one to enter inside the building/premises or in a given work area/location. Moreover, even if user's information is validated but the user enters an incorrect work area and work area in the profile information does not match with the present work area/location, the permission to enter at a given area/location may be denied. Alternatively, if the electronic badge (104) does not reflect the information related to the user with the first device (101), the entry of the user may be denied inside the building/premises. Thus, the profile inform may also include accessibility of the user in a designated location or work area (105).

In an embodiment of the invention, both the first device (101) and the second device (102) may be able to communicate with each other to identify the profile information related to each other. In this case, both the first device (101) and the second device (102) may be configured by corresponding client applications. The unique identifiers may be exchanged by both the first device (101) and the second device (102). In other words, the unique identifier associated with the first device (101) may be received by the second device (102) and the unique identifier associated with the second device (102) may be received by the first device (101). In this way, the first device (101) may obtain the profile information of the user of the second device (102) in the form of the second electronic badge (for user of second device) and the second device may obtain profile information of the user of the first device in the form of the first electronic badge (for user of the first device). Accordingly, the users of the first device (101) and the second device (102) may be able to know the profile information of each other. The profile information for each user may be public information authorized by the server such as name, photograph image, designation of a person inside the premises/building, work area inside the building and the like. In an embodiment of the invention, the unique identifier associated with the first device (101) and the unique identifier associated with the second device (102) are pre-registered with the server.

The present invention is herewith presented using an exemplary situation. For example, a user carrying the mobile device (101) wishes to enter inside a building. The guard carrying the mobile device (102) authorizes the user after validating the user credentials that either the user belongs to the authorized building or an intruder. First, the guard will point his mobile (102) towards the mobile device (101) of the user without any manual interaction. The user mobile device (101) communicates with the guard's mobile device (102) via Bluetooth or any cellular technology. After connection is established between the mobile devices, the guard may receive the unique identifier of the mobile device (101) which is stored within the client application of the mobile device (101). The guard's mobile device (102) using a client application therein on the guard's mobile device (102) may establish a connection with the server application configured within the server (103). The connection between the guard's mobile device (102) and the server may be a Wi-Fi or cellular communication. The server application, based on the unique identifier of the first device (101), processes a profile information of the user and transmits the same on the guard's mobile device (102) in the form of an electronic badge. The profile information such as name, address, User ID, images, encrypted QR code, employer and combination thereof of the user are received in the electronic badge on the guard's mobile device (102). The electronic badge may also accessibility information of the user in a designated location/area (105) along with the profile information as discussed above. The accessibility information may comprise whether the user is "allowed" or "denied access" at the designated location/area. Here the guard is only required to point his mobile device (102) towards the user mobile device (101) and the guard is able to see the user electronic badge with or without user's consent. Therefore, the guard is able to identify the user without any manual validation and accordingly the guard may notify the same to the administrator of the building, if required. Further, if the electronic badge is not validated the guard may identify a user as an intruder or unauthorized person to the building/premises.

In another embodiment, when a user carrying the mobile device (101) enters inside the building and reaches access control device at the entrance, then the profile information of the user with mobile device (101) may be automatically provided to second mobile device (102), In this embodiment, the access control device at the entrance based on unique identifier received from the mobile device (101) transmits the unique identifier to the server (103) and the server in return transmits the user profile information to the second mobile device (102) which is rendered in the form of electronic badge on the second mobile device (102). In another embodiment of the invention, the first device (101) and the second device (102) may interact with each other as discussed above using the respective unique identifiers. In this embodiment, the client applications on the first device (101) and the second device (102) may already have downloaded profile information of different users within the building and may also work during offline. The profile information for each user may be associated with unique identifiers therein. Accordingly, when the first device and the second device interact using the unique identifiers, respective profile information may be rendered on devices. That is, the first device may be able to see the profile information in the form of electronic badge of the user having the second device and the second device may be able to see the profile information in the form of electronic badge of the user with the first device. Similar process may be applied for different users in the building during offline mode.

Figure 2:
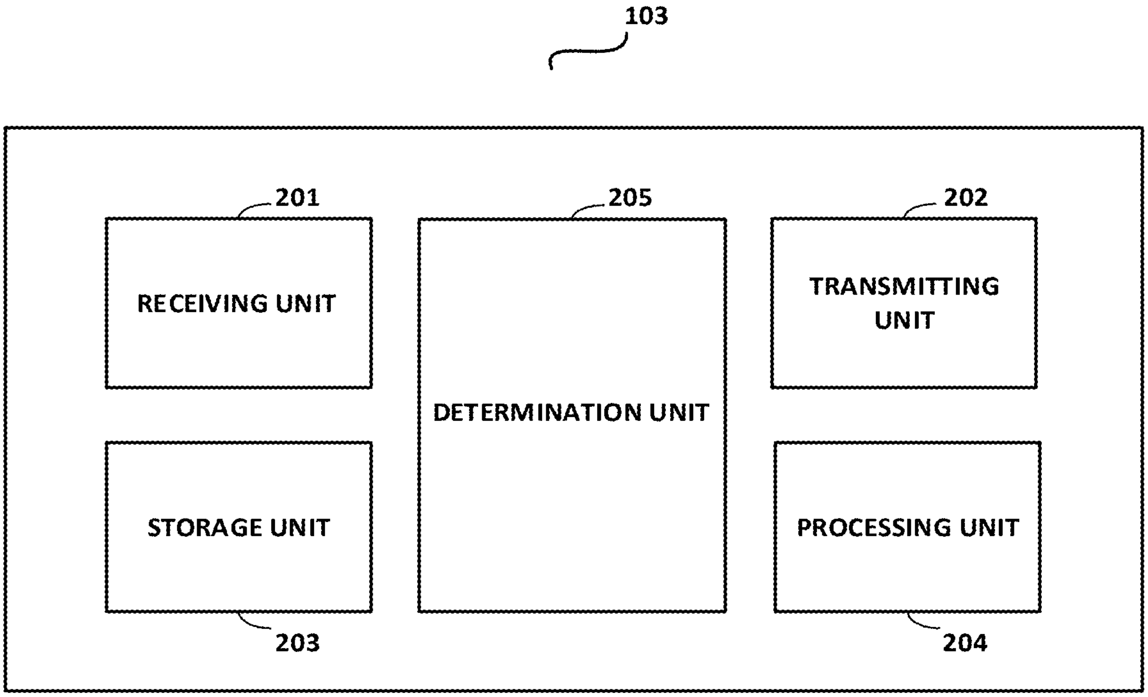
FIG. 2 depicts block diagram of different components of an exemplary remote server according to an exemplary embodiment of the invention.

FIG. 2 illustrates the block diagram of different components of an exemplary remote server (103) according to an exemplary embodiment of the invention. Server (103) may be situated in a location remote to a location of a first device (101) or second device (102) according to embodiments of the invention. Server (103) may be communicatively coupled with the network connections which further permit the server (103) to communicate with one or more mobile devices. The server (103) comprises a receiving unit (201), a transmitting unit (202), a determination unit (205), a storage unit (203), and a processing unit 204. The receiving unit (201), transmitting unit (202), determination unit (205), storage unit (203), and processing unit 204 may be implemented by a processor (e.g., one or more microprocessors) and a memory of the server 103. The processor executes instructions from the memory to implement the receiving unit (201), transmitting unit (202), determination unit (205), storage unit (203), and processing unit 204. In other words, the receiving unit (201), transmitting unit (202), determination unit (205), storage unit (203), and processing unit 204 are computer-implemented components of the server 103.

The receiving unit (201) receives the unique identifier received from the second device (102). The determination unit (205) determine the profile information associated with the unique identifier. For this, the determination unit (205) may communicate with the storage unit (203) to extract the profile information related to the unique identifier and perform comparison of the received unique identifier with the stored plurality of unique identifiers. The determination unit (205) on comparison may obtain the profile information and, the transmitting unit (202) transmits the profile information to the second device (102) as discussed above with respect to FIG. 1.

Moreover, the receiving unit (201), the transmitting unit (202), the determination unit (205), the storage unit (203) may be communicably coupled with the processing unit (204). The different units described herein are exemplary. The invention may be performed using one or more units. For example, the tasks executed by the receiving unit (201), the transmitting unit (202), the determination unit (205), the storage unit (203) may be communicably coupled with the processing unit (204) may be performed by a single unit. Alternatively, a greater number of units as described herein may be used to perform the present invention.

FIG. 3 illustrates an exemplary flowchart illustrating a method to perform the invention according to an exemplary embodiment of the invention. The method flowchart 300 relates to method of sharing user credentials by use of virtual electronic badge to authenticate an entry of a user within an authorized building/premises. The method flowchart 300 starts at step 301. At step 302, method 300 requires establishing a communication of the first device (101) with the second device (102) and the first device (101) is associated with a user and configured to store a unique identifier that represents a user credential issued to the user. This is explained in detail with respect to FIG. 1.

At step 303, method 300 obtains a unique identifier from the first device (101). This is explained in detail with respect to FIG. 1.

At step 304, method 300 sends the obtained unique identifier from the first device (101) to the server (103). The server (103) is communicably coupled with the first device and the second device and configured to store therein a profile information of users related to the first device and the second device. This is explained in detail with respect to FIG. 1.

At block 305, method 300 receives and the profile information from the server and reproduces the profile information in the form of electronic badge on the second device (102). This is explained in detail with respect to FIG. 1. The method 300 may end at step 306.

In one embodiment of the invention, the invention can be operated using the one or more computer readable devices. The one or more computer readable device comprises one or more processors and a memory coupled to the one or more processors. The memory is configured to store instructions executed by the one or more processors. The one or more processors is configured to establish a communication with a first device. The first device is associated with a user and configured to store a unique identifier that represents a user credential issued to the user. The one or more processors is configured to receive the unique identifier from the first device and send the unique identifier to a server on receiving the unique identifier from the first device. The server is communicably coupled with the first device and the second device and configured to store therein a profile information of users related to the first device and the second device. The one or more processors is further configured to receive the profile information from the server and the reproduce the profile information in the form of electronic badge.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purposes or special purpose computing system environments, configurations, or devices.

Examples of the invention may be described in the general context of computer-executable instructions, such as program modules, executed by one or more computers or other devices in software, firmware, hardware, or a combination thereof.

The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising." "including." and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:

a first device associated with a user configured to store a unique identifier that represents a user credential issued to the user;

a second device configured to communicate electronically with the first device and obtain from the first device the unique identifier associated with the user without a user's consent to obtain the unique identifier;

a server communicably coupled with the first device and the second device and configured to:

receive the unique identifier from the second device, store therein a profile information of users related to the first device and the second device, and validate the user of the first device by matching the unique identifier with information present in a database associated with the server; and wherein the second device electronically communicates the unique identifier with the server and receives electronically the profile information related to the user of the first device which is reproduced in the form of an electronic badge on the second device, and the electronic badge comprises user profile data and accessibility of the user in a designated location.

2. The system as claimed in claim 1, wherein the second device communicates with the first device via a client application.

3. The system as claimed in claim 1, wherein the first device and the second device are pre-registered with the server.

4. The system as claimed in claim 1, wherein the client application associated with the second device communicates with a corresponding server application coupled to the database of the server.

5. The system as claimed in claim 1, wherein the profile information comprises a personal information such as name, address, User ID, images, encrypted QR code, employer and combination thereof which identify the user.

6. The system as claimed in claim 1, wherein the second device communicates with the first device via a Bluetooth, Wi-Fi, ultrawide band (UWB), or Internet of Things (IoT).

7. The system as claim 1, wherein the, accessibility comprises whether the user is "allowed" or "denied access" at the designated location.

8. The system as claimed in claim 1, wherein communication between the first device and the second device is configured to be initiated when the second device is pointed toward the first device.

9. A method comprising;

establishing an electronic communication by a second device with a first device, wherein the first device is associated with a user and configured to store a unique identifier that represents a user credential issued to the user;

receiving electronically, by the second device, the unique identifier from the first device without a user's consent from the first device to receive the unique identifier;

sending electronically, by the second device, the unique identifier to a server on receiving the unique identifier from the first device, wherein the server is communicably coupled with the first device and the second device and configured to store therein a profile information of users related to the first device and the second device;

validating, by the server, the user of the first device by matching the unique identifier with information present in a database associated with the server;

identifying, by the server, the profile information of the user associated with the unique identifier; and receiving electronically, by the second device, the profile information from the server, wherein the profile information is reproduced in the form of an electronic badge on the second device, and the electronic badge comprises user profile data and accessibility of the user in a designated location.

10. The method as claimed in claim 9, wherein the second device communicates with the first device via a client application.

11. The method as claimed in claim 9, wherein the first device and the second device are pre-registered with the server.

12. The method as claimed in claim 9, wherein the client application associated with the second device communicates with a corresponding server application coupled to the database of the server.

13. The method as claimed in claim 9, wherein the user profile data comprises a personal information such as name, address, User ID, images, encrypted QR code, employer and combination thereof which identify a particular individual or user.

14. The method as claimed in claim 9, wherein the second device communicates with the first device via a Bluetooth, Wi-Fi, ultrawideband (UWB), or Internet of Things (IoT).

15. The method as claimed in claim 9, wherein establishing communication by the second device with the first device comprises initiating the communication based on a determination made by the second device that the second device is pointed toward the first device.

16. A non-transitory computer readable medium comprising a memory storing instructions executed by one or more processors, the one or more processors configured to:

establish an electronic communication with a first device, wherein the first device is associated with a user and configured to store a unique identifier that represents a user credential issued to the user;

receive at the processor the unique identifier from the first device without a user's consent from the first device to receive the unique identifier;

send from the processor the unique identifier to a server on receiving the unique identifier from the first device, wherein the server is communicably coupled with the first device and the second device and configured to store therein a profile information of users related to the first device and the second device;

validate, by the server, the user of the first device by matching the unique identifier with information present in a database associated with the server;

identify, by the server, the profile information of the user associated with the unique identifier; and receive at the processor the profile information from the server, wherein the profile information is reproduced in the form of electronic badge, and the electronic badge comprises user profile data and accessibility of the user in a designated location.

* * * * *